(12) United States Patent
Arsenault

(10) Patent No.: US 10,807,579 B2
(45) Date of Patent: Oct. 20, 2020

(54) SYSTEM FOR MAINTAINING NEAR-PEAK FRICTION OF A BRAKING WHEEL

(71) Applicant: Goodrich Corporation, Charlotte, NC (US)

(72) Inventor: Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 236 days.

(21) Appl. No.: 16/152,921

(22) Filed: Oct. 5, 2018

(65) Prior Publication Data

US 2019/0225201 A1 Jul. 25, 2019

Related U.S. Application Data

(60) Provisional application No. 62/619,307, filed on Jan. 19, 2018.

(51) Int. Cl.
*B60T 8/1761* (2006.01)
*B60T 8/58* (2006.01)
(Continued)

(52) U.S. Cl.
CPC .......... *B60T 8/17616* (2013.01); *B60T 8/171* (2013.01); *B60T 8/172* (2013.01); *B60T 8/1703* (2013.01);
(Continued)

(58) Field of Classification Search
CPC ...... B60T 8/17616; B60T 8/1703; B60T 8/58; B60T 8/171; B60T 8/321; B60T 8/172; B60T 2270/10; B60T 2240/00
See application file for complete search history.

(56) References Cited

U.S. PATENT DOCUMENTS

| 5,424,948 A | * | 6/1995 | Jordan, Jr. | ............ B60T 8/1705 180/197 |
| 5,948,961 A | * | 9/1999 | Asano | ..................... B60T 8/172 73/9 |

(Continued)

FOREIGN PATENT DOCUMENTS

| CN | 1074056 A | * | 7/1993 | ............... G11B 5/10 |
| CN | 1184047 A | * | 6/1998 | ............. B60T 8/445 |

(Continued)

OTHER PUBLICATIONS

Extended European Search Report dated May 19, 2019, received for corresponding European Application No. 19152753.0.

*Primary Examiner* — Behrang Badii
*Assistant Examiner* — Jalal C Coduroglu
(74) *Attorney, Agent, or Firm* — Kinney & Lange, P.A.

(57) ABSTRACT

Apparatus and associated methods relate to controlling a brake mechanism during braking operation to provide near-maximal braking power. Maximal braking power occurs at when the wheel slip has a target value. Wheel slip can be monitored during braking operation so as to be used in control the brake mechanism to operate at the maximal braking power. The braking power is modulated so as to dither the braking power about a nominal braking power. The monitored wheel slip will have a dither component in response to the dithering of the braking power. A volatility of the dither component of the monitored wheel slip can be indicative of nominal braking power proximity to the maximal braking power. A nominal brake signal can be generated so as to change the nominal braking power in the direction of the maximal braking power based on the volatility of the dither component of the monitored wheel slip.

20 Claims, 5 Drawing Sheets

(51) Int. Cl.
   *B60T 8/171* (2006.01)
   *B60T 8/32* (2006.01)
   *B60T 8/172* (2006.01)
   *B60T 8/17* (2006.01)

(52) U.S. Cl.
   CPC ............... *B60T 8/321* (2013.01); *B60T 8/58* (2013.01); *B60T 2240/00* (2013.01); *B60T 2270/10* (2013.01)

(56) References Cited

U.S. PATENT DOCUMENTS

| | | | |
|---|---|---|---|
| 5,951,122 A | 9/1999 | Murphy | |
| 6,125,318 A | 9/2000 | Zierolf | |
| 6,882,920 B2* | 4/2005 | Rudd, III | B60T 8/1703 303/155 |
| 7,040,958 B2* | 5/2006 | Gan | B24B 37/013 451/41 |
| 7,278,694 B2* | 10/2007 | Choi | B60T 8/17616 303/156 |
| 7,286,909 B2* | 10/2007 | Darke | B60T 8/1703 701/3 |
| 7,938,494 B2* | 5/2011 | Ribbens | B60T 8/1703 303/112 |
| 8,700,516 B2* | 4/2014 | Bell | G06Q 40/06 705/36 R |
| 8,725,618 B1* | 5/2014 | Menzer | G06Q 40/06 705/36 R |
| 10,035,426 B2* | 7/2018 | Lee | H01M 10/4207 |
| 10,248,120 B1* | 4/2019 | Siegel | G01C 21/3407 |
| 10,293,796 B2* | 5/2019 | Georgin | B60T 8/171 |
| 10,377,371 B2* | 8/2019 | Anderson | B60G 17/0195 |
| 10,613,533 B1* | 4/2020 | Payson | G06Q 10/087 |
| 10,647,306 B2* | 5/2020 | Arsenault | B60T 8/171 |
| 2003/0025035 A1* | 2/2003 | Park | B60T 8/1703 244/111 |
| 2005/0038588 A1* | 2/2005 | Shukla | B60T 8/1755 701/70 |
| 2007/0222285 A1 | 9/2007 | Ribbens et al. | |
| 2014/0012777 A1* | 1/2014 | Freeman | G06Q 40/06 705/36 R |
| 2015/0081398 A1* | 3/2015 | Dorai | G06Q 10/067 705/7.37 |
| 2017/0072850 A1* | 3/2017 | Curtis | G08G 1/166 |
| 2018/0350000 A1* | 12/2018 | Asllan | G06Q 40/04 |
| 2019/0222746 A1* | 7/2019 | Yu | H04N 5/232127 |
| 2019/0322255 A1* | 10/2019 | Krucinski | B60T 8/171 |
| 2020/0101952 A1* | 4/2020 | Mastrocola | B60T 8/174 |

FOREIGN PATENT DOCUMENTS

| | | | | |
|---|---|---|---|---|
| CN | 1912613 A | * | 2/2007 | ............ G01N 29/11 |
| CN | 101738728 A | * | 6/2010 | ........... G01B 21/045 |
| CN | 104723341 A | * | 6/2015 | |
| CN | 107928687 A | * | 4/2018 | ........... A61B 6/4405 |
| EP | 0825080 A2 | | 2/1998 | |
| EP | 3514027 A1 | * | 7/2019 | ............... B60T 8/58 |
| FR | 2924392 A3 | | 6/2009 | |
| KR | 20030025035 A | * | 3/2003 | ........... G01B 21/045 |
| WO | WO-03104057 A1 | * | 12/2003 | ............. B60T 8/325 |
| WO | WO-2007078212 A1 | * | 7/2007 | ............ F25J 3/0426 |
| WO | WO-2014184894 A1 | * | 11/2014 | ............ H04L 9/065 |
| WO | WO-2017163073 A1 | * | 9/2017 | ........... G05B 13/025 |

* cited by examiner

SYSTEM FOR MAINTAINING NEAR-PEAK FRICTION OF A BRAKING WHEEL

CROSS-REFERENCE TO RELATED APPLICATION(S)

This application claims the benefit of U.S. Provisional Application No. 62/619,307 filed Jan. 19, 2018 for "System for Maintaining Near-Peak Friction of a Braking Wheel" by T. Arsenault.

BACKGROUND

Many vehicles are equipped with various types of braking systems. Wheeled vehicles can be equipped with a disk brake system, a drum brake system, engine brake systems, electrical-energy harvesting systems, other types of braking systems, or combinations of such systems. For wheeled vehicles, each type of braking system is ultimately limited by a peak value of friction of the ground/wheel interface.

The efficacy of a braking system is therefore limited by this ground/wheel interface. The friction of the ground/wheel interface can depend on many factors. For example, the tire condition, the road condition, the vehicle dynamics, etc. can all affect the friction of the ground/wheel interface, and can therefore affect braking efficacy.

Some of the factors that affect the friction of the ground/wheel interface are independent of the specific wheeled vehicle and independent of the specific braking system of such wheeled vehicle. For example, road conditions can be affected by pavement material, debris on the pavement, and weather conditions. Weather conditions can dramatically affect road conditions. For example, rain, snow, and ice can dramatically change the friction of the ground/wheel interface.

The friction of the ground/wheel interface can also vary in as a function of wheel slip. Wheel slip is difference between ground speed and a rotation speed of the wheel. The rotation speed of a wheel, during a braking operation, is not necessarily equal to the ground speed. When a wheeled vehicle is coasting, the rotation speed of the wheel is approximately equal to the ground speed. When, modest brake power is applied, however, the elasticity of the tire causes it to deform in response to forces induced by the braking operation. Such tire deformation can reduce the effective circumference of the tire, thereby reducing the rotation speed of the tire with respect to the ground speed. If sufficient braking power is applied, the tire can skid with respect to the ground surface, further increasing slip ratio.

SUMMARY

Apparatus and associated methods relate to a system for maintaining peak friction of wheel/ground interface during a braking operation of a wheeled vehicle. The system includes a perturbation controller configured to provide a small-signal high-frequency perturbation signal to a brake mechanism so as to cause the brake mechanism to dither braking power. The system includes a slip detector configured to determine wheel slip based on a difference between ground speed and rotation speed of the wheel. The system includes a volatility calculator configured to calculate a measure of volatility of wheel slip based on a small-signal high-frequency component of the determined wheel slip. The system also includes a brake controller configured to generate a brake control signal for transmission to the brake mechanism of the wheel based, at least in part, on the calculated measure of volatility.

Some embodiments relate to a method for maintaining peak friction of wheel/ground interface during a braking operation of a wheeled vehicle. The method includes providing, by a perturbation controller, a small-signal high-frequency perturbation signal to a brake mechanism so as to cause the brake mechanism to dither braking power. Then, wheel slip is determined, by a slip detector, based on a difference between ground speed and rotation speed of the wheel. A measure of volatility of wheel slip is calculated, by a volatility calculator, volatility based on a small-signal high-frequency component of the determined wheel slip. Then. a brake control signal is generated, by a brake controller, for transmission to the brake mechanism of the wheel based, at least in part, on the calculated measure of volatility.

DETAILED DESCRIPTION

Apparatus and associated methods relate to controlling a brake mechanism during braking operation to provide near-maximal braking power. Maximal braking power occurs when the wheel slip has a target value. Wheel slip can be monitored during braking operation so as to be used to control the brake mechanism to operate at the maximal braking power. The braking power is modulated so as to dither the braking power about a nominal braking power. The monitored wheel slip will have a dither component in response to the dithering of the braking power. A volatility of the dither component of the monitored wheel slip can be indicative of nominal braking power proximity to the maximal braking power. A nominal brake signal can be generated so as to change the nominal braking power in the direction of the maximal braking power based on the volatility of the dither component of the monitored wheel slip.

Figure 1:
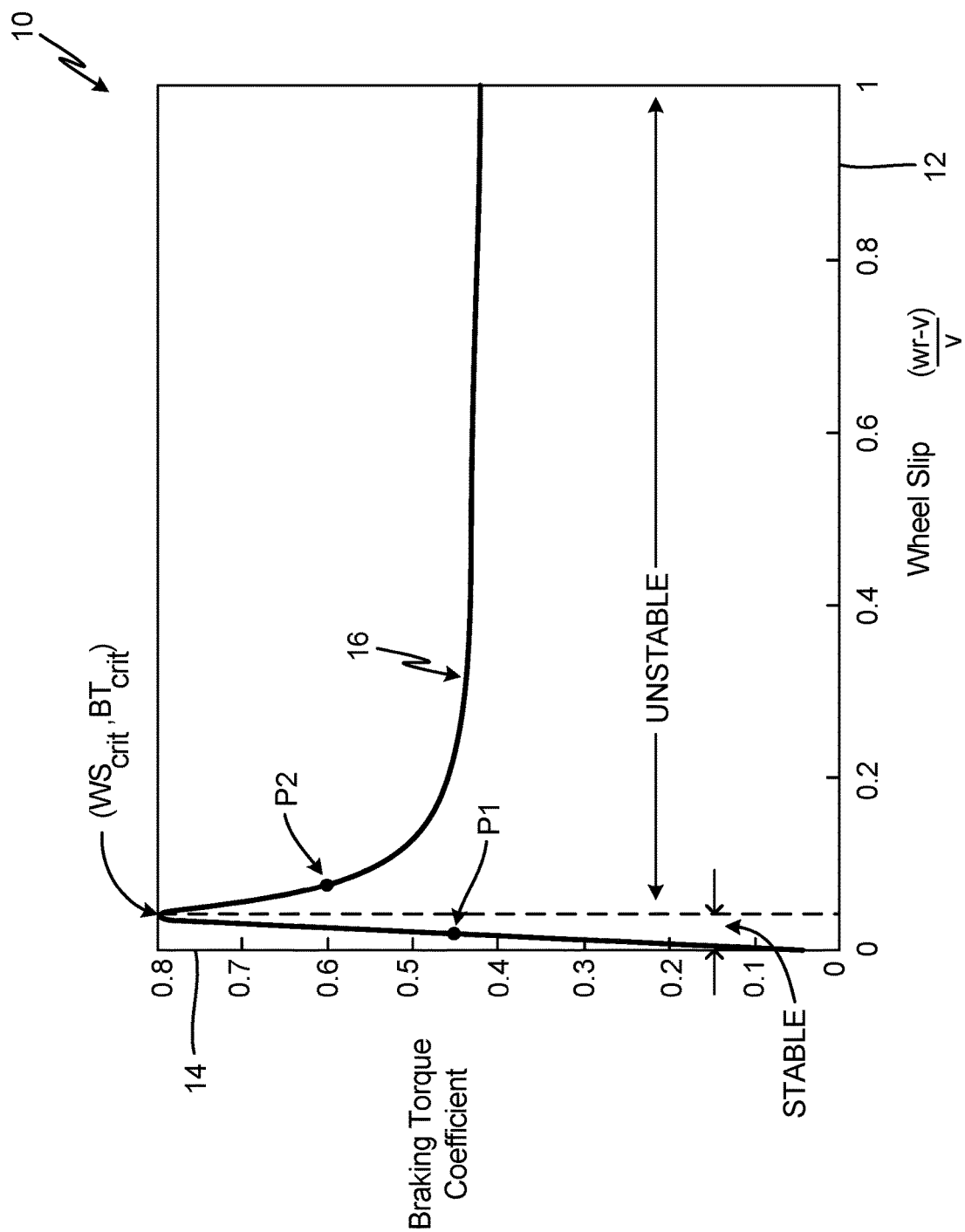
FIG. 1 is a graph depicting the relationship between braking torque coefficient and wheel slip.

FIG. 1 is a graph depicting the relationship between braking torque coefficient and wheel slip. In FIG. 1, graph 10 has horizontal axis 12 and vertical axis 14. Horizontal axis 12 is indicative of a measure of wheel slip as given by $(\omega_{tire} r_{tire} - v_{gs})/v_{gs}$. Here, $\omega_{tire}$ is the angular rotational velocity of a tire of the wheel, $r_{tire}$ is the radius of the tire of the wheel, and $v_{gs}$ is a ground speed of the vehicle to which the wheel belongs. Vertical axis 14 is indicative of a measure of braking torque coefficient as given by $F_t/N_v$. Here, $F_t$ is the tire tractive or braking force, and $N_v$ is the normal force of the vehicle. The normal force $N_v$ can be thought of as force of the wheel directed vertically upon the ground surface.

Such a force is affected by vehicle weight, payload weight, lift, center of gravity, location of the wheel and other vehicle dynamics.

Braking torque coefficient/wheel slip relation 16 is shown on graph 10 to indicate a functional relationship between braking torque coefficient and wheel slip. As indicated in relation 16, braking torque coefficient is zero when wheel slip is zero. This indicates that when the wheel is freely rotating without locomotion or application of braking power, both wheel slip and braking torque coefficient are zero. Then, as braking power is applied to the system, both wheel slip and the braking torque coefficient increases. The braking torque coefficient increases in response to increasing wheel slip critical point ($BT_{crit}$, $WS_{crit}$). At critical wheel slip $WS_{crit}$, critical braking torque coefficient $BT_{crit}$ is at a maximum value. As braking power is further increased causing wheel slip to increase to values greater than critical wheel slip $WS_{crit}$, the braking torque coefficient decreases to values less than critical braking torque coefficient $BT_{crit}$.

The consequences of such a braking torque coefficient/wheel slip relation 16 as indicated in graph 10 are many. First, as a braking system is operated at braking powers that are low, so as to cause wheel slip values that are less than $WS_{crit}$, the braking system is operating in a stable regime. When the braking system is operated at braking powers that are high, so as to cause wheel slip values that are greater than $WS_{crit}$, the braking system is operating in an unstable regime.

If, for example, the braking power is applied so as cause operation at operating point P1 as indicated on relation 16, the braking system is being operated in the stable regime. At operating point P1, the vehicle is decelerating at a rate proportional to the braking force as computed using the braking torque coefficient indicated at operating point P1. A small additional increase in braking power will cause the operating point to shift to an operating point that has a slightly greater value of wheel slip and a greater value of braking torque coefficient. This in turn will cause the vehicle to decelerate at a rate proportional to the braking force computed using a greater value of braking torque coefficient than that indicated at operating point P1. In short, braking force will be increased.

If, however, the braking power is applied so as cause operation at operating point P2 as indicated on relation 16, the braking system is being operated in the unstable regime. At operating point P2, the vehicle is decelerating at a rate proportional to the braking force as computed using the braking torque coefficient indicated at operating point P2. A small additional increase in braking power will cause the operating point to shift to an operating point that has a slightly greater value of wheel slip but a lower value of braking torque coefficient. This in turn will cause the vehicle to decelerate at a rate proportional to the braking force computed using a lower value of braking torque coefficient than that indicated at operating point P2. In short, braking force will be decreased. Because the braking force is decreased, the brake mechanism of the wheel can lock up, thereby causing the wheel slip to further increase. Such further increase in the value of wheel slip further reduces the breaking torque coefficient.

Figure 2:
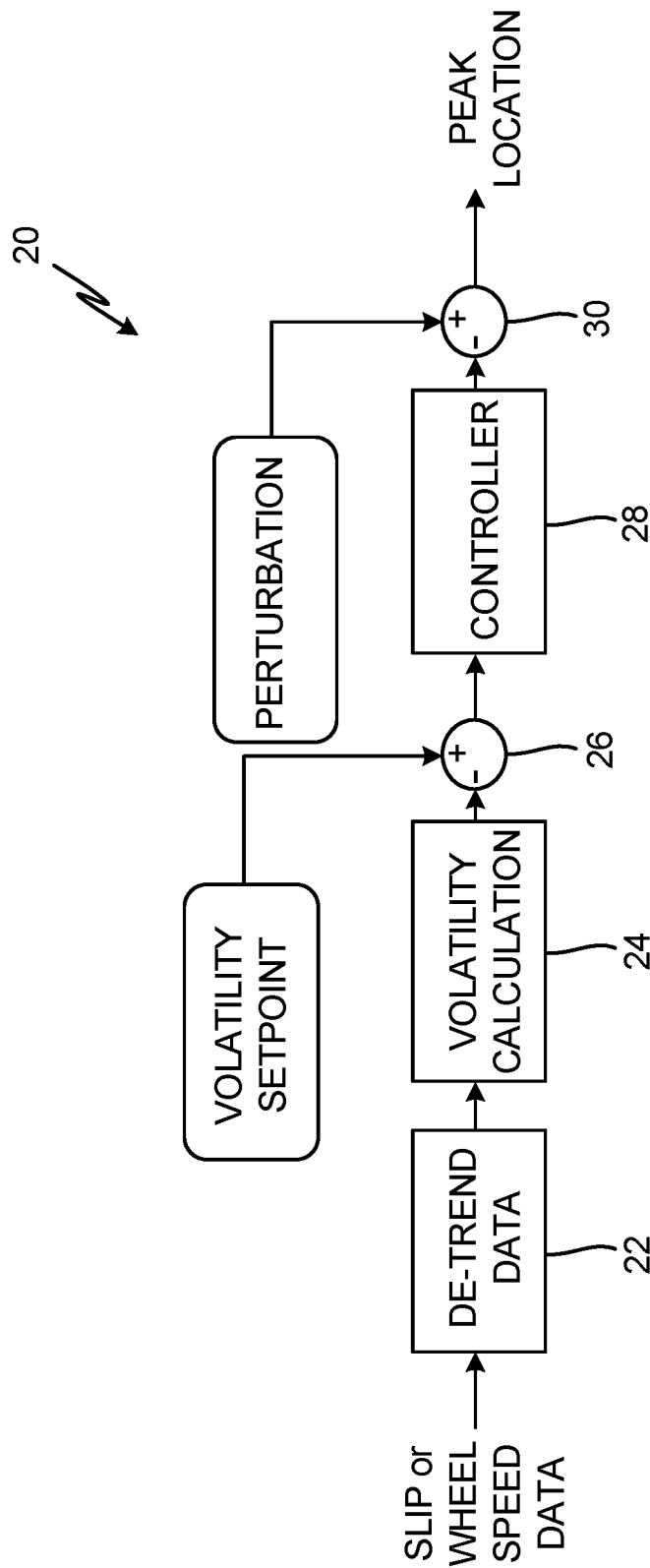
FIG. 2 is a block diagram of an embodiment of a system for controlling braking power based on volatility of wheel slip.

FIG. 2 is a block diagram of an embodiment of a system for controlling braking power based on volatility of wheel slip. In FIG. 2, brake control system 20 includes de-trend module 22, volatility calculator 24, volatility comparator 26, controller 28, and perturbation summer 30. Brake control system 10 receives wheel-slip data that indicates the ratio of a difference between wheel rotational speed and ground speed to ground speed. The wheel-slip data is received by de-trend module 22. De-trend module 22, removes high-frequency components of the received wheel-slip data. In some embodiments, de-trend module 22 can include a low-pass filter so as to perform the de-trend operation. The wheel-slip data includes high-frequency components that are passed by de-trend module 22 to volatility calculator 24. Volatility calculator 24 performs a measurement of the magnitude of the high-frequency components of the wheel-slip data (e.g., a measure of volatility) passed thereto. In various embodiments, various measurements of the magnitude of the high-frequency components can be made, including, for example, a measurement of AC power and/or a peak-to-peak measurement.

The measure of volatility of the wheel-slip data is then compared to a volatility target by volatility comparator 26. In the embodiment depicted in FIG. 2, volatility comparator 26 generates a signal indicative of a difference between the measure of volatility and the volatility target. Volatility comparator 26 sends the generated difference signal to controller 28. Controller 28 then generates a brake control signal based on the received signal indicative of a difference between the measured volatility and the volatility target. The controller sends the brake control signal to perturbation summer 30. Perturbation summer 30 adds a high-frequency perturbation to the generated brake control signal so as to dither the braking mechanism about the braking power that is actuated based on the brake control signal. This dithering of the braking mechanism about the braking power set by the brake control signal that causes the high-frequency components of wheel slip to occur.

Figure 3:
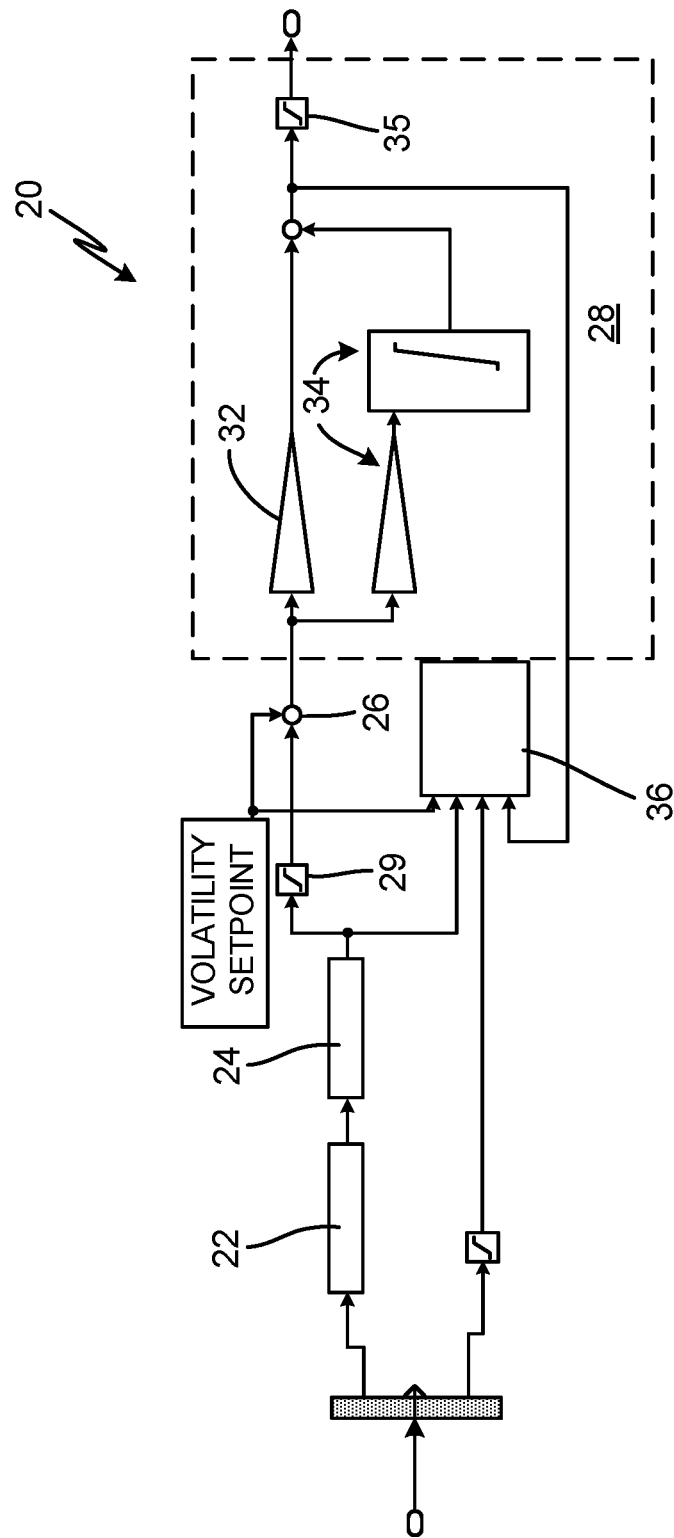
FIG. 3 is a schematic diagram of an embodiment of a system for controlling braking power based on volatility of wheel slip.

FIG. 3 is a schematic diagram of an embodiment of a system for controlling braking power based on volatility of wheel slip. In FIG. 3, an embodiment of brake control system 20 depicted in FIG. 2 is realized schematically. Brake control system 20 includes de-trend module 22, volatility calculator 24, volatility comparator 26, and controller 28. In the FIG. 3 embodiment, perturbations are introduced by controller 28. Again, wheel-slip data is received by de-trend module 22. De-trend module 22 removes the low-frequency trend component of the received wheel-slip data. The wheel-slip data includes high-frequency components that are passed by de-trend module 22 to volatility calculator 24. Volatility calculator 24 performs a measurement of the magnitude of the high-frequency components of the wheel-slip data (e.g., a measure of volatility) passed thereto. Volatility calculator 24 generates a signal indicative of the measure of volatility calculated and send the signal to both controller 28 and saturation module 29.

Saturation module 29 saturates the received signal at predetermined levels, if the magnitude of the received signal is indicative of a measure of volatility that is greater than a predetermined maximum value or less than a predetermined minimum value. The saturated measure of volatility of the wheel-slip data is then compared to a volatility target by volatility comparator 26. Controller 28 then receives, from volatility comparator 26, a signal indicative of a difference between the saturated measure of volatility and a predetermined volatility target. Controller 28 has Proportional channel 32 and Integrated channel 34, thereby forming a PI controller. Proportional channel 32 generates a signal indicative of the difference between the saturated measure of volatility and the volatility target. In some embodiments, the gain of proportional channel is large so as to cause perturbations about the signal generated by integrated channel 34.

Integrated channel 34 generates a signal indicative of the integrated difference between the saturated measure of volatility and the volatility target. In some embodiments, the signal generated by integrated channel 34 includes the low-frequency trend component of the brake control signal sent to a braking mechanism. The signals generated by proportional channel 32 and integrated channel 34 are then summed and sent to saturation module 35. Saturation module 35 saturates the received PI signal at predetermined levels, if the magnitude of the received PI signal is greater than a predetermined maximum value or less than a predetermined minimum value. Saturation module 35 then sends the saturated PI signal to a braking mechanism.

Also depicted in the FIG. 3 embodiment is mode control module 36. Mode control module 36 controls operation of brake controller 20. In some embodiments, mode control module 36 sends mode control signals to brake controller 20. Brake controller 30 then controls operation of Proportional and Integrated channels 32 and 34 in response to the received mode control signals. For example, in some embodiments, brake controller enables Proportional channel 32 and disables Integrated channel 34 when the wheel-slip data indicates operation in the stable regime (i.e., wheel slip is less than the critical value $WS_{crit}$). In some embodiments, Integrated channel 34 is enabled when a skid detector detects that the wheel is in a skid mode. In some embodiments, integrated channel 34 is reset when a brake pedal pressure exceeds a predetermined threshold.

Figure 4:
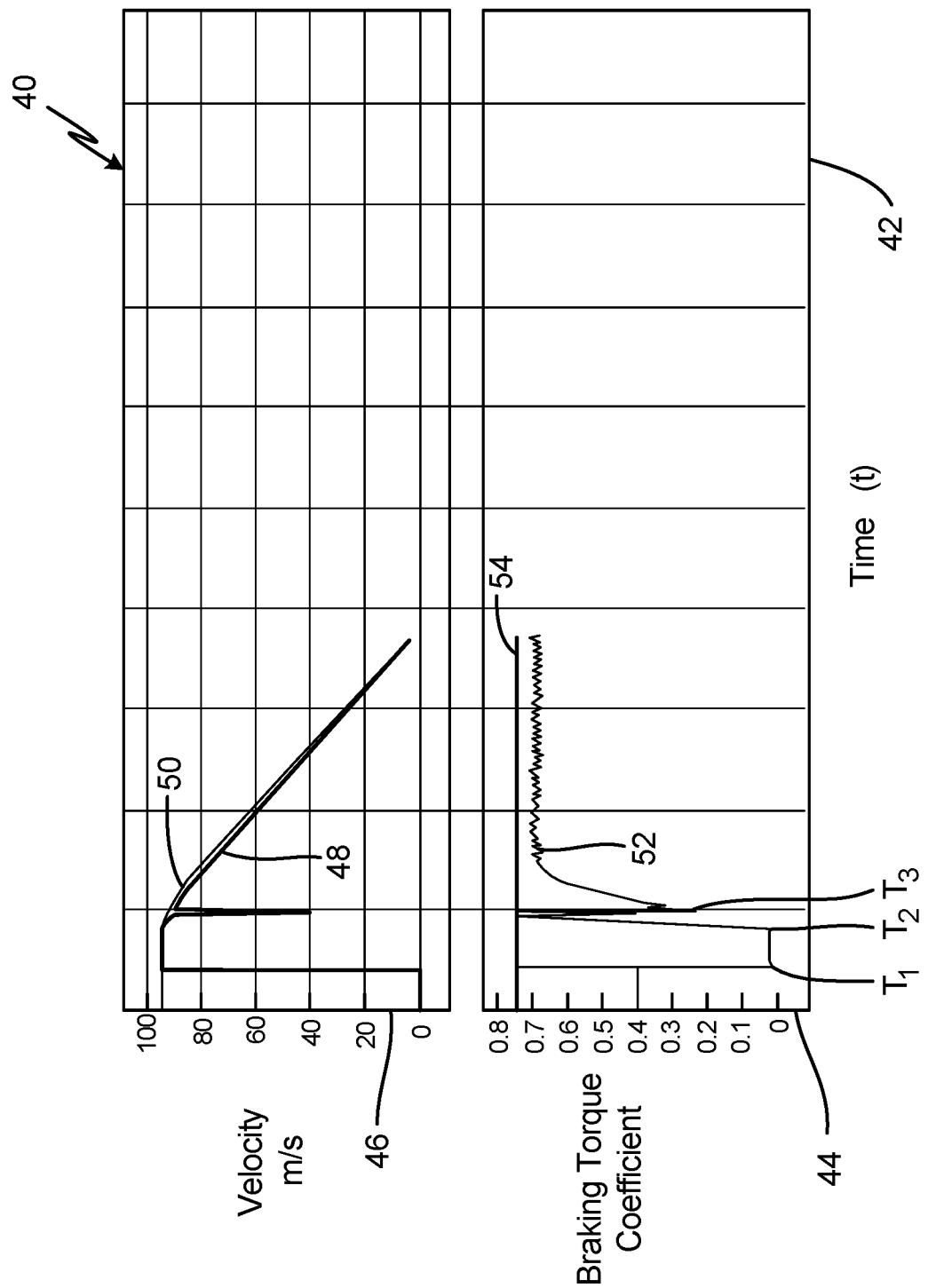
FIG. 4 is a graph indicating various braking metrics of a system for controlling braking power based on volatility of wheel slip.

FIG. 4 is a graph indicating various braking metrics of a system for controlling braking power based on volatility of wheel slip. In FIG. 4, graph 40 includes horizontal axis 42 and vertical axes 44 and 46. Horizontal axis 42 is indicative of time (t). Vertical axis 44 is indicative of velocity (m/s). Vertical axis 46 is indicative of braking torque coefficient ($\mu$). Graph 40 depicts a simulation of a brake control system of the FIG. 3 depicted schematic diagram. Graph 40 also depicts rotational wheel velocity 48, ground speed 50, braking torque coefficient 52, and maximum braking torque coefficient 54 as functions of time.

At time $T_1$, a simulated aircraft wheel has made contact with a runway and has assumed a rotational wheel velocity 48 equal to the ground speed 50 of the aircraft, as indicated by rotational wheel velocity 48 and ground speed 50. Rotational wheel velocity and ground speed are equal to one another between times $T_1$ and $T_2$. Between time $T_1$ and $T_2$, braking torque coefficient 52 is approximately zero, thereby indicating that little if any braking power is being applied by a braking mechanism to the wheel of the aircraft. At time $T_2$, brake power begins to be applied by the braking mechanism, as indicated by the suddenly increasing value of braking torque coefficient 52. Rotational wheel velocity 48 and ground speed 50 also begin to decrease after time $T_2$.

Then, at time $T_3$, rotational wheel velocity 48 suddenly decreases to a value much less than ground speed 50. Such a sudden separation between rotational wheel velocity 48 and ground speed 50 can be indicative of a skid. The difference between rotational wheel velocity 48 and ground speed 50 is wheel slip. Immediately after the skid is initiated, brake controller 28 (depicted in FIG. 3) begins to control the braking power, based on volatility of wheel skid. A perturbation signal is added to the brake control signal sent to the braking mechanism and the brake control signal is reduced so as to terminate skidding. Rotational wheel velocity 48 again approaches values substantially equal to ground speed 50. Braking torque coefficient 52 dips to a value around 0.4 and closed loop control begins.

As indicated in graph 40, braking torque coefficient 52 soon climbs to a value of 0.7 where it is maintained for the remaining duration of braking operation. After time $T_3$, both rotational wheel velocity 48 and ground speed 50 monotonically decrease until both speeds 48 and 50 are reduced to zero. At zero speed, the aircraft is stopped. After time $T_3$, rotational wheel velocity 48 and ground speed 50 are modestly separated from one another. This separation is indicative of wheel slip. The controlled wheel slip during this time period after time $T_3$ is the wheel slip corresponding to the controlled braking torque coefficient of 0.7.

Figure 5:
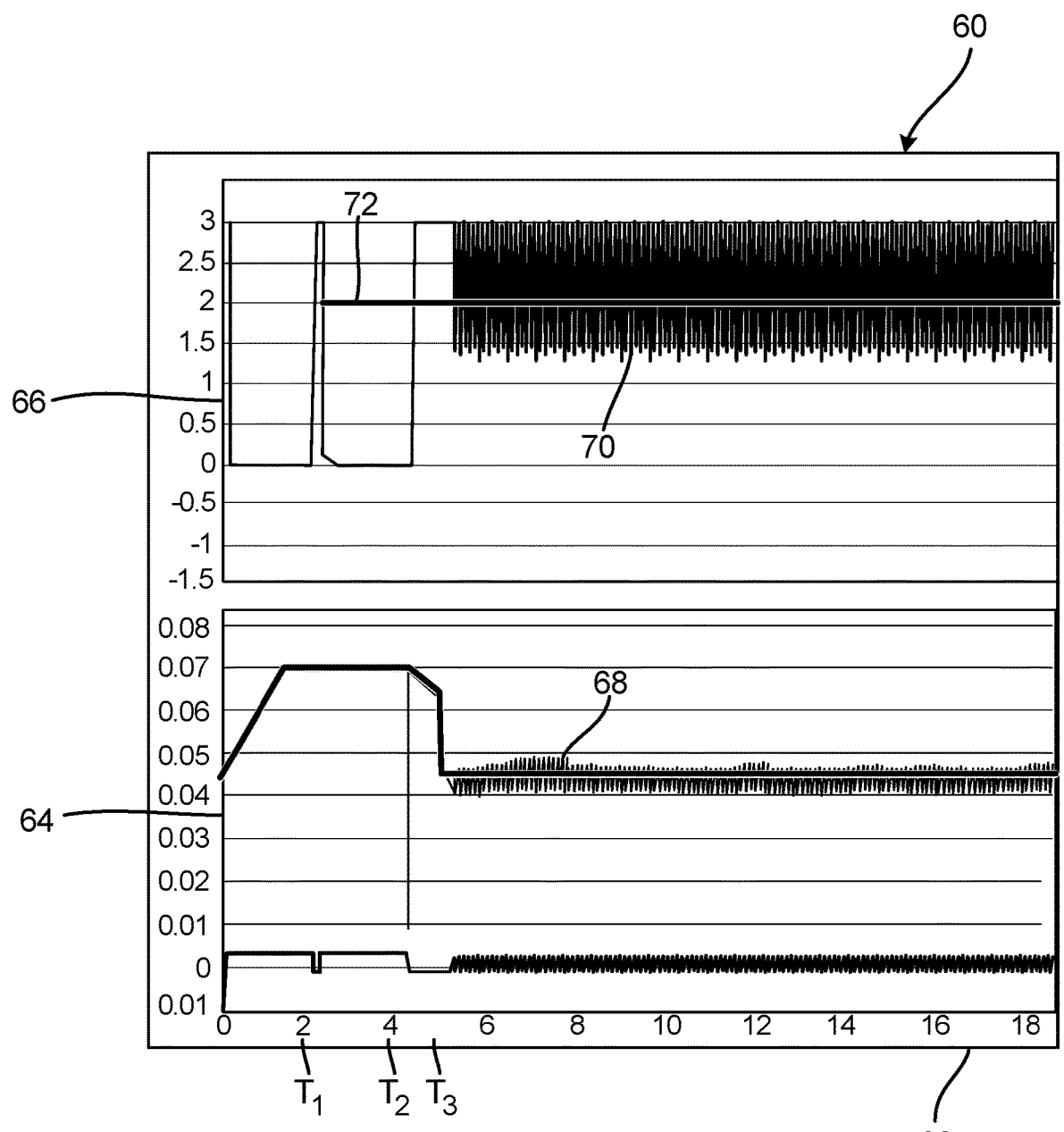
FIG. 5 is a graph indicating various intermediate metrics of a system for controlling braking power based on volatility of wheel slip.

FIG. 5 is a graph indicating various intermediate metrics of a system for controlling braking power based on volatility of wheel slip. Graph 60 depicted in FIG. 5 shows intermediate calculations corresponding to the simulation whose braking metrics are depicted in FIG. 4. In FIG. 5, graph 60 includes horizontal axis 62 and vertical axes 64 and 66. Horizontal axis 62 is indicative of time (t). Vertical axis 64 is indicative of wheel slip. Vertical axis 66 is indicative of volatility. Graph 60 again depicts simulation results of a brake control system of the FIG. 3 depicted schematic diagram. Graph 60 also depicts wheel slip ratio 68, volatility 70, and volatility target 72 as functions of time.

At time $T_1$, a simulated aircraft wheel has made contact with a runway and has assumed a rotational velocity equal to the ground velocity of the aircraft. At time $T_1$, wheel slip ratio 68 is at 0.01 and volatility (of wheel slip) is near zero. Wheel slip ratio 68 and volatility remain at these values between times $T_1$ and $T_2$. At time $T_2$, brake power begins to be applied by the braking mechanism, as indicated by the suddenly increasing value of wheel slip ratio 68. Wheel slip ratio 68 increases until it reaches a value of 0.75—a value greater than the critical value $WS_{crit}$. At this value of wheel slip, a skid begins and brake controller 28 (depicted in FIG. 3) begins to control braking power based on volatility 70. Between times $T_2$ and $T_3$, brake controller 28 reduces the braking power, thereby reducing wheel slip ratio 68. At time $T_3$, wheel slip ratio 68 is reduced to a value of approximately 0.35, which is approximately equal or even less than to the critical value $WS_{crit}$. At times greater than $T_3$, brake controller 28 is in closed-loop control of braking system 20 (as depicted in FIG. 3).

The oscillations of volatility 70 about volatility target 72 indicate that the brake control signal generated by the brake controller causes the brake mechanism to decrease the braking power if the calculated measure of volatility is greater than the volatility target. Conversely, the brake control signal generated by the brake controller causes the brake mechanism to increase the braking power if the magnitude of the calculated measure of volatility is less than the volatility target.

Discussion of Possible Embodiments

The following are non-exclusive descriptions of possible embodiments of the present invention.

Apparatus and associated methods relate to a system for maintaining near-peak friction of a wheel/ground interface during a braking operation of a wheeled vehicle. The system includes a perturbation controller configured to provide a high-frequency perturbation signal to a brake mechanism so as to cause the brake mechanism to dither braking power. The system includes a slip detector configured to determine wheel slip based on a difference between ground speed and rotation speed of the wheel. The system includes a volatility calculator configured to calculate a measure of volatility of the wheel slip based on a high-frequency component of the determined wheel slip. The system also includes a brake controller configured to generate a brake control signal for transmission to the brake mechanism of the wheel based, at least in part, on the calculated measure of volatility.

The system of the preceding paragraph can optionally include, additionally and/or alternatively, any one or more of the following features, configurations and/or additional components:

A further embodiment of the foregoing system, wherein the brake controller can be configured to compare the calculated measure of volatility with a predetermined volatility target.

A further embodiment of any of the foregoing systems, wherein the brake control signal generated by the brake controller can be configured to cause the brake mechanism to decrease the braking power if the calculated measure of volatility is greater than the predetermined volatility target.

A further embodiment of any of the foregoing systems, wherein the brake control signal generated by the brake controller can be configured to cause the brake mechanism to increase the braking power if the magnitude of the calculated measure of volatility is less than the predetermined volatility target.

A further embodiment of any of the foregoing systems can further include a skid detector configured to detect a skid based on the determined wheel slip.

A further embodiment of any of the foregoing systems, wherein the skid detector can be further configured to compare the determined wheel slip with a predetermined slip threshold.

A further embodiment of any of the foregoing systems, wherein the skid detector can be configured to detect a skid if the determined wheel slip is greater than the predetermined slip threshold.

A further embodiment of any of the foregoing systems, wherein the system can be configured to begin maintaining peak friction of the wheel/ground interface in response to the skid detector having detected a skid.

A further embodiment of any of the foregoing systems, wherein the brake controller can include a proportional channel configured to generate a signal proportional to a difference between the calculated measure of volatility and a selected volatility target.

A further embodiment of any of the foregoing systems, wherein the proportional channel can be configured to have a saturation limit that determines the calculated measure of volatility.

A further embodiment of any of the foregoing systems, wherein the proportional channel can have a channel gain that is greater than a target value so as to cause the small-signal high-frequency perturbation signal in closed-loop operation of the system.

A further embodiment of any of the foregoing systems, wherein the brake controller can include an integrated channel configured to generate a signal proportional to an integrated difference between the calculated measure of volatility and a predetermined volatility target.

Some embodiments relate to a method for maintaining near-peak friction of wheel/ground interface during a braking operation of a wheeled vehicle. The method includes providing, by a perturbation controller, a small-signal high-frequency perturbation signal to a brake mechanism so as to cause the brake mechanism to dither braking power. The method includes determining, by a slip detector, wheel slip based on a difference between ground speed and rotation speed of the wheel. The method includes calculating, by a volatility calculator, a measure of volatility of wheel slip based on a small-signal high-frequency component of the determined wheel slip. The method also includes generating, by a brake controller, a brake control signal for transmission to the brake mechanism of the wheel based, at least in part, on the calculated measure of volatility.

The method of the preceding paragraph can optionally include, additionally and/or alternatively, any one or more of the following features, configurations and/or additional components:

A further embodiment of the foregoing method can further include comparing, by the brake controller, the calculated measure of volatility with a predetermined volatility target.

A further embodiment of any of the foregoing methods, wherein the brake control signal generated by the brake controller can be configured to cause the brake mechanism to decrease the braking power if the calculated measure of volatility is greater than the predetermined volatility target.

A further embodiment of any of the foregoing methods, wherein the brake control signal generated by the brake controller can be configured to cause the brake mechanism to increase the braking power if the magnitude of the calculated measure of volatility is less than the predetermined volatility target.

A further embodiment of any of the foregoing methods can further include detecting, by a skid detector, a skid based on the determined wheel slip.

A further embodiment of any of the foregoing methods can further include comparing, by the skid detector, the determined wheel slip with a predetermined slip threshold.

A further embodiment of any of the foregoing methods, wherein the skid detector can be configured to detect a skid if the determined wheel slip is greater than the predetermined slip threshold.

A further embodiment of any of the foregoing methods, wherein the system can be configured to begin maintaining peak friction of the wheel/ground interface in response to the skid detector having detected a skid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for maintaining near-peak friction of a wheel/ground interface during a braking operation of a wheeled vehicle, the system comprising:
    a perturbation controller configured to provide a high-frequency perturbation signal to a brake mechanism so as to cause the brake mechanism to dither braking power;
    a slip detector configured to determine wheel slip based on a difference between ground speed and rotation speed of the wheel;
    a volatility calculator configured to calculate a measure of volatility of the wheel slip based on a high-frequency component of the determined wheel slip; and
    a brake controller configured to generate a brake control signal for transmission to the brake mechanism of the wheel based, at least in part, on the calculated measure of volatility.

2. The system of claim 1, wherein the brake controller is configured to compare the calculated measure of volatility with a predetermined volatility target.

3. The system of claim 2, wherein the brake control signal generated by the brake controller is configured to cause the brake mechanism to decrease the braking power if the calculated measure of volatility is greater than the predetermined volatility target.

4. The system of claim 2, wherein the brake control signal generated by the brake controller is configured to cause the brake mechanism to increase the braking power if the magnitude of the calculated measure of volatility is less than the predetermined volatility target.

5. The system of claim 1, further comprising:
a skid detector configured to detect a skid based on the determined wheel slip.

6. The system of claim 5, wherein the skid detector is further configured to compare the determined wheel slip with a predetermined slip threshold.

7. The system of claim 6, wherein the skid detector is configured to detect a skid if the determined wheel slip is greater than the predetermined slip threshold.

8. The system of claim 5, wherein the system is configured to begin maintaining peak friction of the wheel/ground interface in response to the skid detector having detected a skid.

9. The system of claim 1, wherein the brake controller includes:
a proportional channel configured to generate a signal proportional to a difference between the calculated measure of volatility and a selected volatility target.

10. The system of claim 9, wherein the proportional channel is configured to have a saturation limit that determines the calculated measure of volatility.

11. The system of claim 9, wherein the proportional channel has a channel gain that is greater than a target value so as to cause the small-signal high-frequency perturbation signal in closed-loop operation of the system.

12. The system of claim 1, wherein the brake controller includes:
an integrated channel configured to generate a signal proportional to an integrated difference between the calculated measure of volatility and a predetermined volatility target.

13. A method for maintaining near-peak friction of wheel/ground interface during a braking operation of a wheeled vehicle, the method comprising:
providing, by a perturbation controller, a small-signal high-frequency perturbation signal to a brake mechanism so as to cause the brake mechanism to dither braking power;
determining, by a slip detector, wheel slip based on a difference between ground speed and rotation speed of the wheel;
calculating, by a volatility calculator, a measure of volatility of wheel slip based on a small-signal high-frequency component of the determined wheel slip; and
generating, by a brake controller, a brake control signal for transmission to the brake mechanism of the wheel based, at least in part, on the calculated measure of volatility.

14. The method of claim 13, further comprising:
comparing, by the brake controller, the calculated measure of volatility with a predetermined volatility target.

15. The method of claim 14, wherein the brake control signal generated by the brake controller is configured to cause the brake mechanism to decrease the braking power if the calculated measure of volatility is greater than the predetermined volatility target.

16. The method of claim 14, wherein the brake control signal generated by the brake controller is configured to cause the brake mechanism to increase the braking power if the magnitude of the calculated measure of volatility is less than the predetermined volatility target.

17. The method of claim 13, further comprising:
detecting, by a skid detector, a skid based on the determined wheel slip.

18. The system of claim 17, further comprising:
comparing, by the skid detector, the determined wheel slip with a predetermined slip threshold.

19. The method of claim 18, wherein the skid detector is configured to detect a skid if the determined wheel slip is greater than the predetermined slip threshold.

20. The method of claim 17, wherein the system is configured to begin maintaining peak friction of the wheel/ground interface in response to the skid detector having detected a skid.

* * * * *